United States Patent
Suzuki et al.

(10) Patent No.: US 9,306,228 B2
(45) Date of Patent: Apr. 5, 2016

(54) FUEL CELL HAVING AN IMPROVED GAS CHANNEL

(71) Applicant: HONDA MOTOR CO., LTD., Tokyo (JP)

(72) Inventors: Masaharu Suzuki, Wako (JP); Kentaro Ishida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 192 days.

(21) Appl. No.: 14/135,580

(22) Filed: Dec. 20, 2013

(65) Prior Publication Data

US 2014/0178789 A1 Jun. 26, 2014

(30) Foreign Application Priority Data

Dec. 25, 2012 (JP) ................................. 2012-281274

(51) Int. Cl.
*H01M 8/10* (2006.01)
*H01M 8/02* (2006.01)

(52) U.S. Cl.
CPC .......... *H01M 8/0263* (2013.01); *H01M 8/0254* (2013.01); *H01M 8/0206* (2013.01); *H01M 2008/1095* (2013.01); *Y02E 60/521* (2013.01)

(58) Field of Classification Search
CPC ............ H01M 8/0263; H01M 8/0254; H01M 8/0206; H01M 2008/1095; Y02E 60/521
USPC .......................................................... 429/480
See application file for complete search history.

(56) References Cited

U.S. PATENT DOCUMENTS

| 7,195,837 | B2 | 3/2007 | Suzuki et al. | |
| 2010/0285384 | A1* | 11/2010 | Nakagawa et al. | 429/454 |
| 2011/0274999 | A1 | 11/2011 | Mohri et al. | |

FOREIGN PATENT DOCUMENTS

| JP | 2003-338300 | 11/2003 |
| JP | 2006-147466 | 6/2006 |

* cited by examiner

*Primary Examiner* — Gary Harris
(74) *Attorney, Agent, or Firm* — Mori & Ward, LLP (57) ABSTRACT

A fuel cell includes a solid polymer electrolyte membrane, and a cathode separator and an anode separator sandwiching a solid polymer electrolyte membrane therebetween. The fuel cell includes an oxidant gas channel including a plurality of wave-shaped channel portions extending in a horizontal direction. Part of one of the plurality of wave-shaped channel portions that is disposed at the lower end in the vertical direction protrude downward from a planar region of electrode catalyst layers, i.e. a power generation region, in the vertical direction.

10 Claims, 9 Drawing Sheets

FUEL CELL HAVING AN IMPROVED GAS CHANNEL

CROSS REFERENCES TO RELATED APPLICATIONS

The present application claims priority under 35 U.S.C. §119 to Japanese Patent Application No. 2012-281274, filed Dec. 25, 2012, entitled "Fuel Cell." The contents of this application are incorporated herein by reference in their entirety.

BACKGROUND

1. Field

The present application relates to a fuel cell.

2. Description of the Related Art

For example, a solid polymer electrolyte fuel cell includes a unit cell including a membrane electrode assembly (MEA) and a pair of separators sandwiching the MEA therebetween. The MEA includes an electrolyte membrane made from a polymer ion-exchange membrane, an anode electrode disposed on one side of the electrolyte membrane, and a cathode electrode disposed on the other side of the electrolyte membrane. Typically, a predetermined number of unit cells of this type are stacked and used as a vehicle fuel cell stack.

A fuel cell includes a metal separator that is press-formed so as to have a corrugated form. A fuel gas channel (hereinafter, also referred to as a reactant gas channel) for supplying a fuel gas to the anode electrode or an oxidant gas channel (hereinafter, also referred to as a reactant gas channel) for supplying an oxidant gas to the cathode electrode are formed in a surface of the metal separator. In each power generation cell or in each set of power generation cells, a coolant channel for supplying coolant is formed along the in-plane direction of the metal separator.

In this case, the coolant channel is formed between the back side of the fuel gas channel and the back side of the oxidant gas channel. Accordingly, in a case where a fuel gas channel and an oxidant gas channel are formed on separators each made by forming a thin metal plate so as to have a wave-like pattern, a coolant channel is formed by overlapping the wave-like shapes on the back sides of wave-shaped channels so that the phases of the wave-like shapes differ from each other.

For example, in a fuel cell described in Japanese Unexamined Patent Application Publication No. 2003-338300, at least one of a first hollow protruding portion that forms a fuel gas channel and a second hollow protruding portion that forms an oxidant gas channel is bent so that part of a top surface of the first hollow protruding portion and part of a top surface the second hollow protruding portion are separated from each other and a connection channel are formed between them. Therefore, the fuel cell can be efficiently cooled because cooling water can flow through the connection channel.

In some cases, the wave-shaped channels of the fuel gas channel and the oxidant gas channel extend in a horizontal direction. For example, in order to install a fuel cell in a space having a limited height, it is necessary that the fuel cell have a horizontally elongated shape. Accordingly, it is preferable that the fuel gas channel and the oxidant gas channel be formed so as to make the fuel gas and the oxidant gas flow in the horizontal direction.

Therefore, each of the wave-shaped channels has recessed portions that are curved or bent downward and then extend upward. Accordingly, water tends to accumulate in such recessed portions that are disposed at a lower position in the vertical direction. In such a recessed portion, for example, metal ions may dissolve into water from a separator and a precious metal may dissolve into water from an electrode. Thus, a problem arises in that, when the dissolved ions are trapped in an electrolyte membrane, the electrolyte membrane deteriorates and the performance of the electrodes decreases.

Moreover, in general, at end portions of an electrode, a higher tension and a higher shearing stress are likely to be applied to the electrolyte membrane than at a central portion of the electrode.

SUMMARY

According to an aspect of the present application, a fuel cell includes a membrane electrode assembly including an electrolyte membrane and a pair of electrodes sandwiching the electrolyte membrane therebetween, each of the electrodes including an electrode catalyst layer and a gas diffusion layer; a separator stacked on the membrane electrode assembly in a first horizontal direction, the separator and the membrane electrode assembly being disposed in upright positions so that electrode surfaces extend in a vertical direction; and a reactant gas channel through which a reactant gas flows along one of the electrode surfaces in a second horizontal direction, the reactant gas being an oxidant gas or a fuel gas.

In the fuel cell, the reactant gas channel includes a plurality of wave-shaped channel portions arranged in the vertical direction and each extending in the second horizontal direction so as to form a wave-like shape, and part of at least one of the plurality of wave-shaped channel portions that is disposed at an end in the vertical direction protrudes outward from a planar region of the electrode catalyst layers in the vertical direction.

DESCRIPTION OF THE EMBODIMENTS

Figure 1:
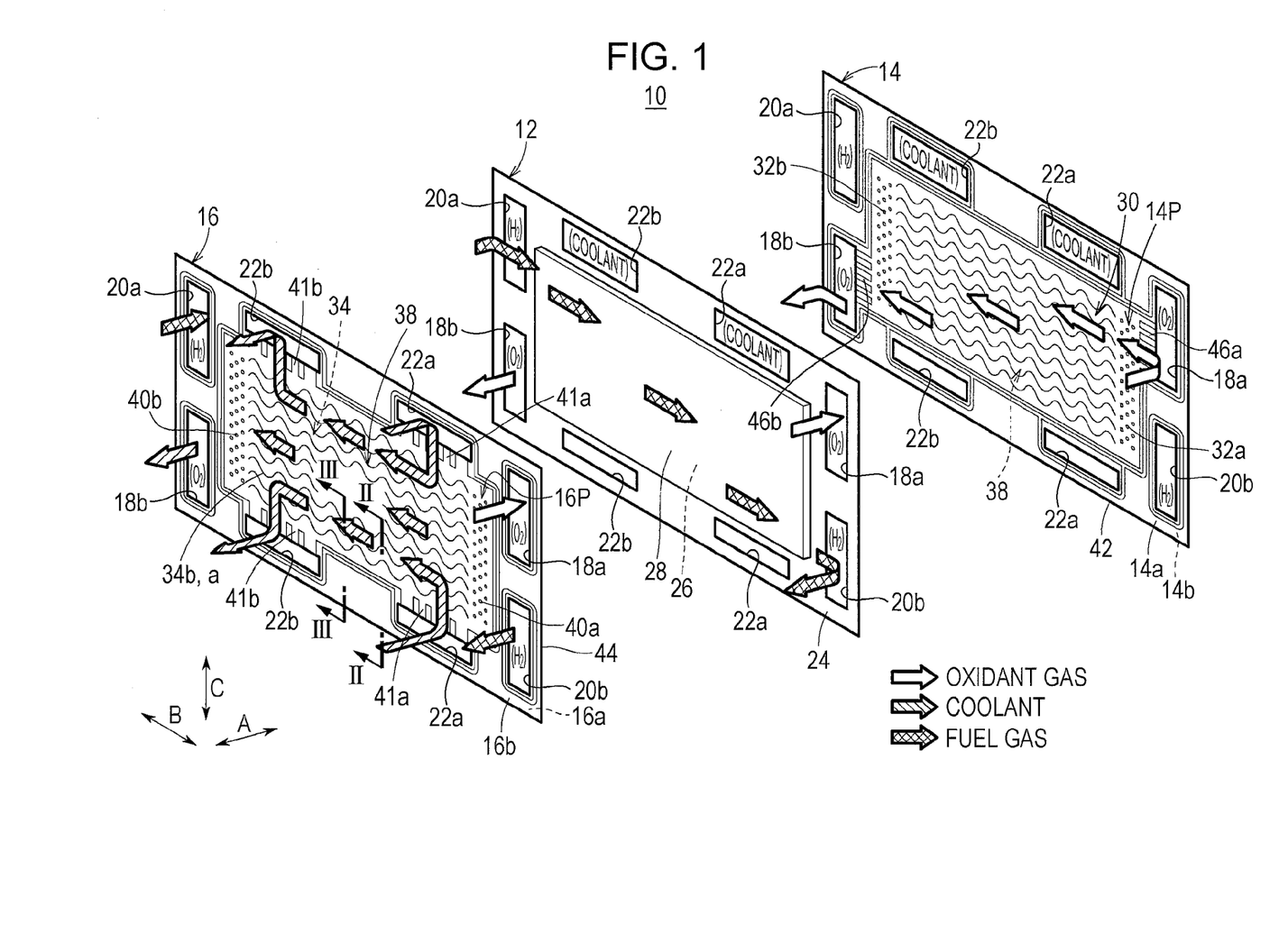
FIG. 1 is an exploded perspective view of a fuel cell according to a first embodiment.
Figure 2:
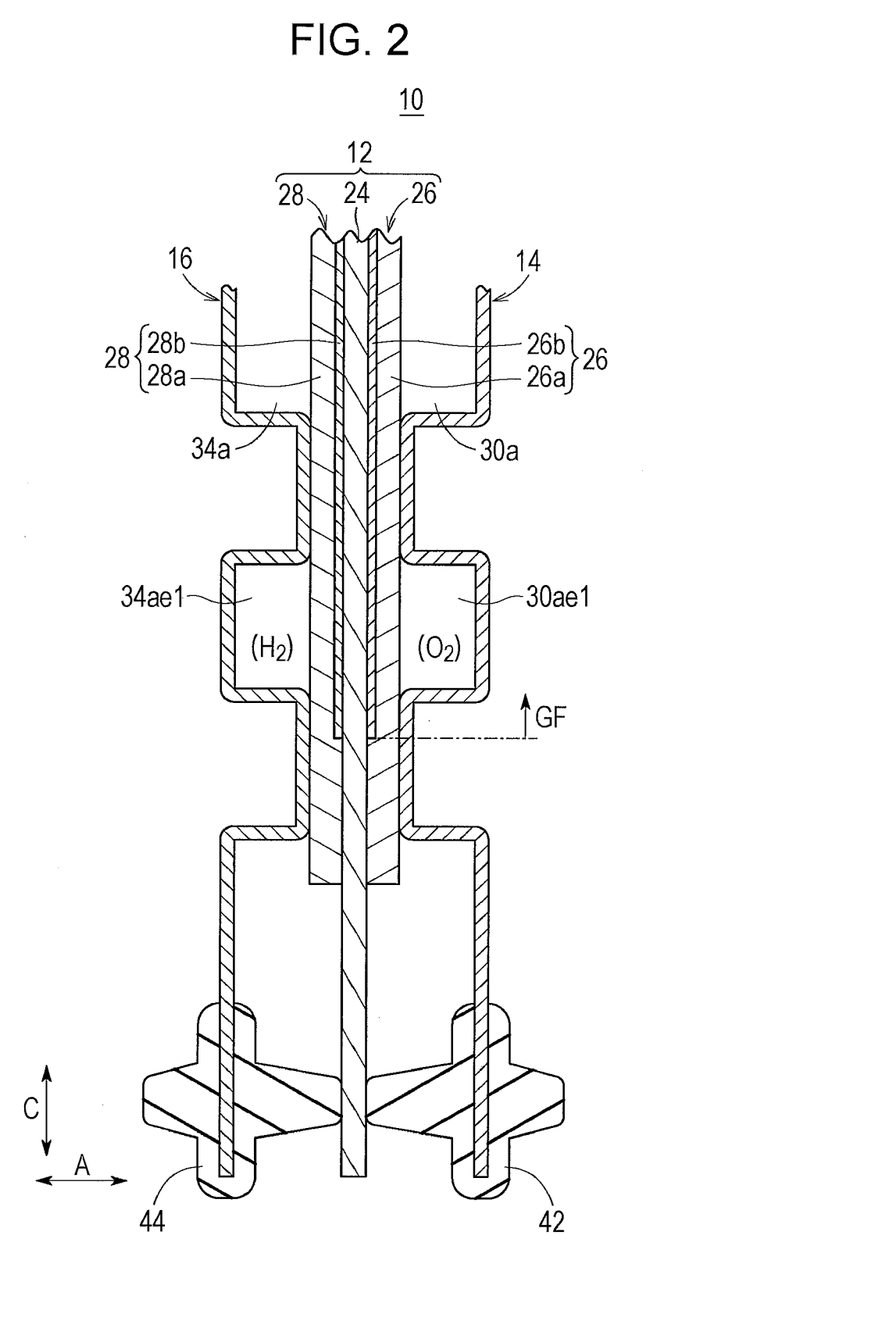
FIG. 2 is a cross-sectional view of the fuel cell taken along line II-II in FIG. 1.
Figure 3:
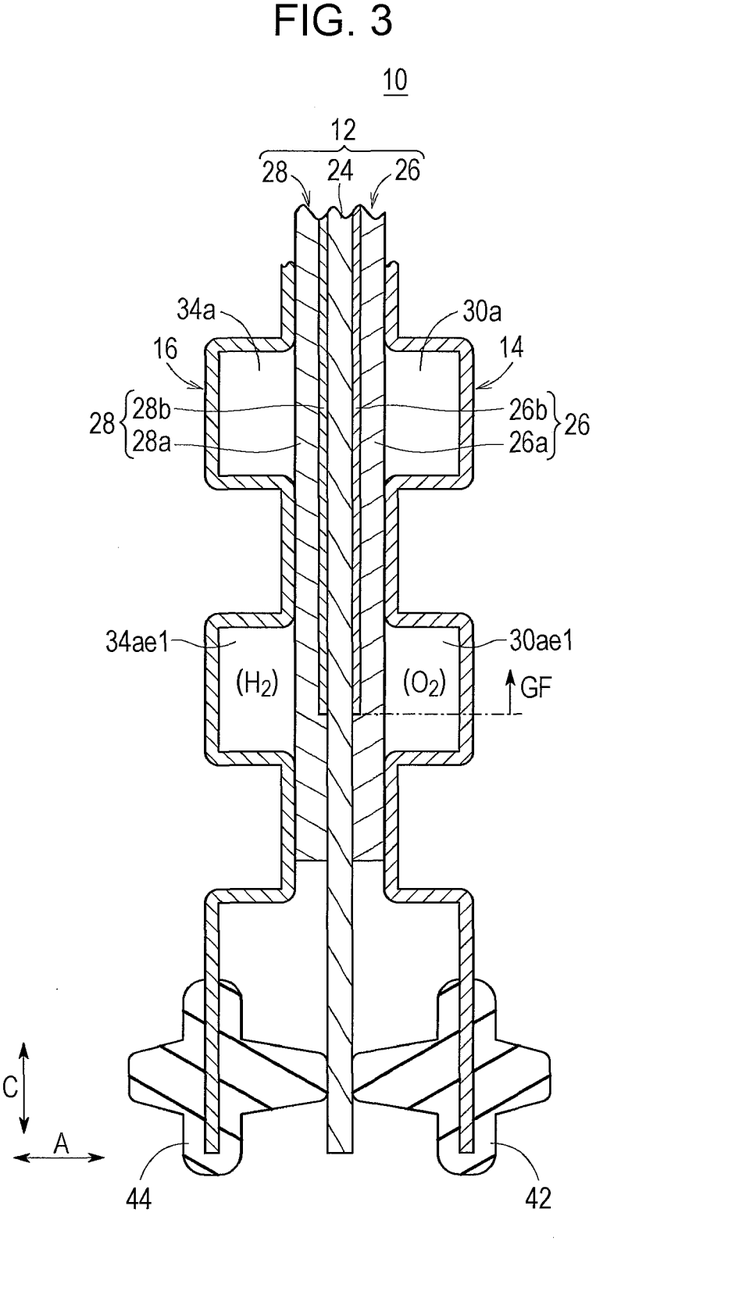
FIG. 3 is a cross-sectional view of the fuel cell taken along line in FIG. 1.

As illustrated in FIGS. 1 to 3, a plurality of fuel cells 10 according to a first embodiment are stacked in the direction of arrow A so as to form a fuel cell stack. Each of the fuel cells 10 includes a membrane electrode assembly 12, and a cathode separator 14 and an anode separator 16 sandwiching the membrane electrode assembly 12 therebetween. The membrane electrode assembly 12 and the separators 14 and 16 are stacked in a horizontal direction and disposed in upright positions so that electrode surfaces extend in the vertical direction.

The cathode separator 14 and the anode separator 16 are each made from a thin plate, such as a steel plate, a stainless steel plate, an aluminum plate, a galvanized steel plate, or any of such thin plates having an anti-corrosive coating on the surface thereof. The separators 14 and 16 each have a corrugated cross-sectional shape formed by press-forming a thin plate so as to have a wave-like pattern. The cathode separator 14 and the anode separator 16 may be carbon separators.

As illustrated in FIG. 1, each of the cathode separator 14 and the anode separator 16 has a horizontally elongated shape having short sides extending in the vertical direction (direction of arrow C) and long sides extending in a horizontal direction (direction of arrow B) (so as to be stacked in a horizontal direction).

An oxidant gas inlet manifold 18a and a fuel gas outlet manifold 20b are formed in the fuel cell 10 so as to extend in the direction of arrow A through one end portion of the fuel cell 10 in the longitudinal direction (direction of arrow B). An oxidant gas, such as an oxygen-containing gas, is supplied through the oxidant gas inlet manifold 18a. A fuel gas, such as a hydrogen-containing gas, is discharged through the fuel gas outlet manifold 20b.

A fuel gas inlet manifold 20a and an oxidant gas outlet manifold 18b are formed in the fuel cell 10 so as to extend in the direction of arrow A through the other end portion of the fuel cell 10 in the longitudinal direction. The fuel gas is supplied through the fuel gas inlet manifold 20a. The oxidant gas is discharged through the oxidant gas outlet manifold 18b.

A pair of coolant inlet manifolds 22a are formed in the fuel cell 10 so as to extend in the direction of arrow A through one end portions of the fuel cell 10 in the transversal direction (in the direction of arrow C). A coolant is supplied through the coolant inlet manifolds 22a. A pair of coolant outlet manifolds 22b are formed in the fuel cell 10 so as to extend through the other end portions of the fuel cell 10 in the transversal direction. The coolant is discharged through the coolant outlet manifolds 22b.

The membrane electrode assembly 12 includes a solid polymer electrolyte membrane 24, and a cathode electrode 26 and an anode electrode 28 sandwiching the solid polymer electrolyte membrane 24 therebetween. The solid polymer electrolyte membrane 24 is made of, for example, a fluoropolymer or a hydrocarbon polymer.

As illustrated in FIGS. 2 and 3, the cathode electrode 26 and the anode electrode 28 respectively include gas diffusion layers 26a and 28a and electrode catalyst layers 26b and 28b. The gas diffusion layers 26a and 28a are made of carbon paper or the like. The electrode catalyst layers 26b and 28b are each formed on a surface of a corresponding one of the gas diffusion layers 26a and 28a by uniformly coating the surface with porous carbon particles whose surfaces support a platinum alloy. The electrode catalyst layers 26b and 28b are formed on both sides of the solid polymer electrolyte membrane 24 so as to form a power generation region GF.

The gas diffusion layers 26a and 28a have the same planar dimensions (surface area). The planar dimensions (surface area) of each of the gas diffusion layers 26a and 28a are (is) smaller than those (that) of the solid polymer electrolyte membrane 24. The electrode catalyst layers 26b and 28b have the same planar dimensions (surface area). The planar dimensions (surface area) of each of the electrode catalyst layers 26b and 28b are (is) smaller than those (that) of each of the gas diffusion layers 26a and 28a.

The membrane electrode assembly 12 may be a so-called stepped MEA. In other words, the planar dimensions of the cathode electrode 26 may be smaller than those of the anode electrode 28, or the planar dimensions of the cathode electrode 26 may be larger than those of the anode electrode 28.

Figure 4:
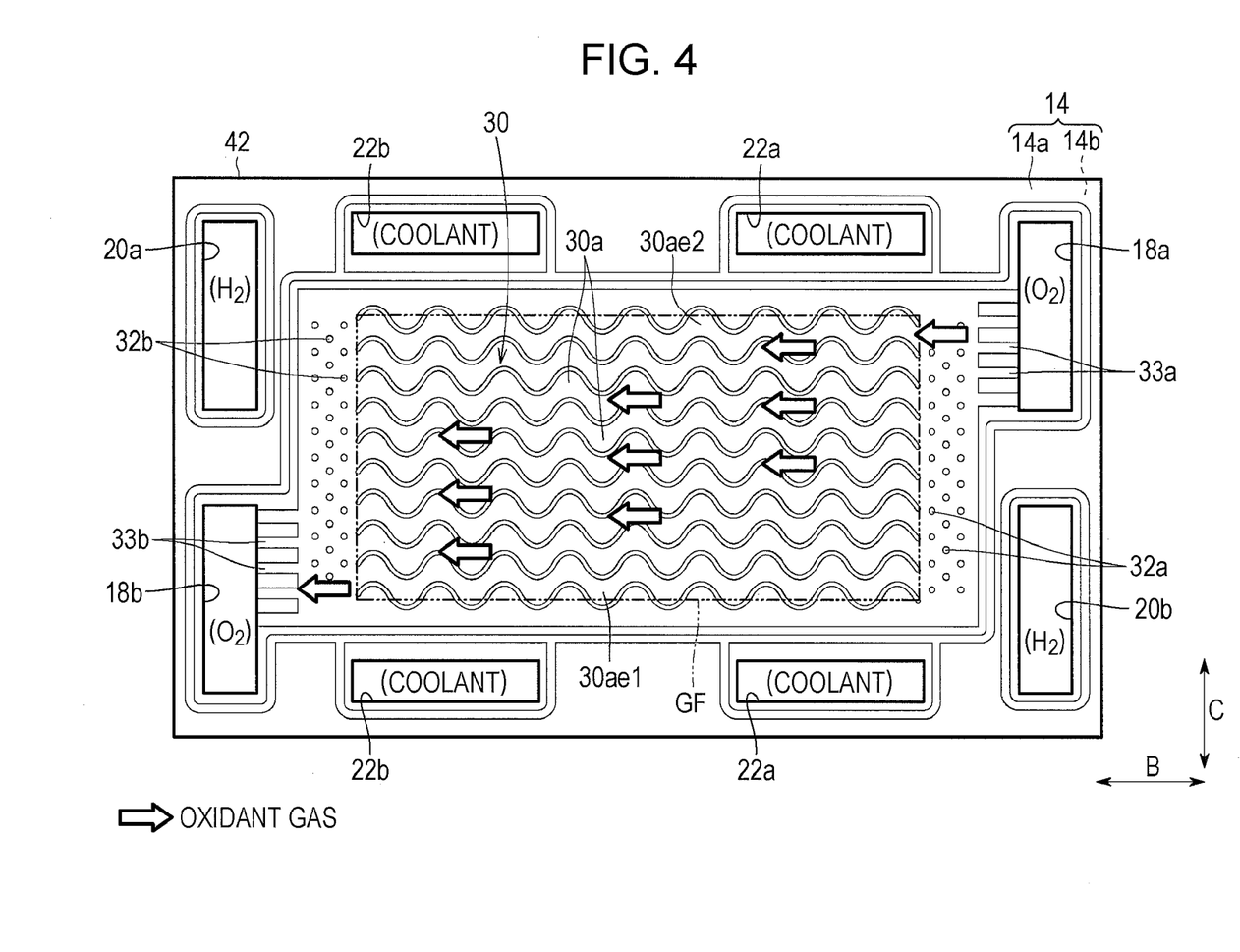
FIG. 4 is a plan view of a cathode separator of the fuel cell.

As illustrated in FIG. 4, an oxidant gas channel 30, through which the oxidant gas inlet manifold 18a is connected to the oxidant gas outlet manifold 18b, is formed on a surface 14a of the cathode separator 14 facing the membrane electrode assembly 12. The oxidant gas channel 30 includes a plurality of wave-shaped channel portions 30a arranged in the vertical direction and each extending in a horizontal direction in a wave-like shape. The oxidant gas channel 30 may have any appropriate shape including shapes that change periodically in the vertical direction, such as a zigzag shape or a rectangular-wave shape.

The plurality of wave-shaped channel portions 30a include wave-shaped channel portions 30ae1 and 30ae2, which are disposed at ends in the vertical direction. Part of each of the wave-shaped channel portions 30ae1 and 30ae2 protrudes outward from a planar region of the electrode catalyst layers 26b and 28b, i.e. the power generation region GF, in the vertical direction. The wave-shaped channel portion 30ae1 is disposed at the lower end in the vertical direction, and the position of the lower end of the power generation region GF is set along lower parts of the wave-shaped channel portion 30ae1, which are curved (or bent) downward. The wave-shaped channel portion 30ae2 is disposed at the upper end in the vertical direction, and the position of the upper end of the power generation region GF is set along upper parts of the wave-shaped channel portion 30ae2, which are curved (or bent) upward.

An inlet buffer portion 32a and an outlet buffer portion 32b are respectively disposed in the vicinities of the inlet and the outlet of the oxidant gas channel 30. Each of the inlet and outlet buffer portions 32a and 32b has a plurality of embossed portions. The inlet buffer portion 32a is connected to the oxidant gas inlet manifold 18a through a plurality of inlet connection channels 33a. The outlet buffer portion 32b is connected to the oxidant gas outlet manifold 18b through a plurality of outlet connection channels 33b.

Figure 5:
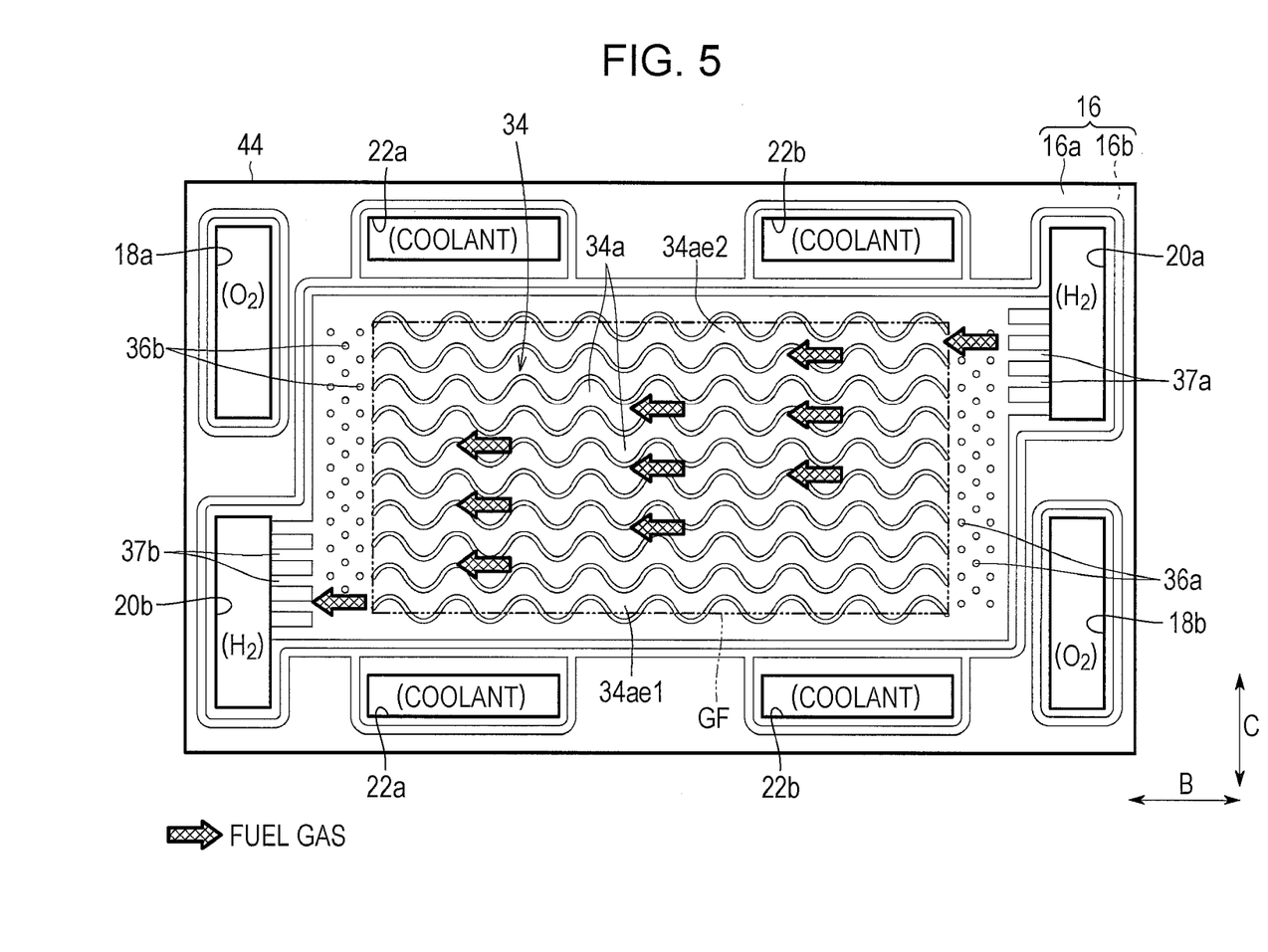
FIG. 5 is a plan view of an anode separator of the fuel cell.

As illustrated in FIG. 5, a fuel gas channel 34, through which the fuel gas inlet manifold 20a is connected to the fuel gas outlet manifold 20b, is formed on a surface 16a of the anode separator 16 facing the membrane electrode assembly 12. The fuel gas channel 34 includes a plurality of wave-shaped channel portions 34a arranged in the vertical direction and each extending in a horizontal direction in a wave-like shape. The fuel gas channel 34 may have any appropriate shape including shapes that change periodically in the vertical direction, such as a zigzag shape or a rectangular-wave shape. It is preferable that the phase of the wave-shaped channel portions 30a on the cathode side and the phase of the wave-shaped channel portions 34a on the anode side be the same. However, the phase of the wave-shaped channel portions 30a and the phase of the wave-shaped channel portions 34a may differ from each other.

The plurality of wave-shaped channel portions 34a include wave-shaped channel portions 34ae1 and 34ae2, which are disposed at ends in the vertical direction. Part of each of the wave-shaped channel portions 34ae1 and 34ae2 protrudes outward from the planar region of the electrode catalyst layers 26b and 28b, i.e. the power generation region GF, in the vertical direction. The wave-shaped channel portion 34ae1 is disposed at the lower end in the vertical direction, and the position of the lower end of the power generation region GF is set along lower parts of the wave-shaped channel portion 34ae1, which are curved (or bent) downward. The wave-shaped channel portion 34ae2 is disposed at the upper end in the vertical direction, and the position of the upper end of the power generation region GF is set along upper parts of the wave-shaped channel portion 34*ae*2, which are curved (or bent) upward.

An inlet buffer portion 36*a* and an outlet buffer portion 36*b* are respectively disposed in the vicinities of the inlet and the outlet of the fuel gas channel 34. Each of the inlet and outlet buffer portions 36*a* and 36*b* has a plurality of embossed portions. The inlet buffer portion 36*a* is connected to the fuel gas inlet manifold 20*a* through a plurality of inlet connection channels 37*a*. The outlet buffer portion 36*b* is connected to the fuel gas outlet manifold 20*b* through a plurality of outlet connection channels 37*b*.

A coolant channel 38 is formed between a surface 16*b* of the anode separator 16 and a surface 14*b* of the cathode separator 14 of an adjacent fuel cell 10 (see FIG. 1). The coolant channel 38 is connected to the pair of coolant inlet manifolds 22*a* and to the pair of coolant outlet manifolds 22*b*. Along the coolant channel 38, the coolant flows over the area of the membrane electrode assembly 12 corresponding to the electrodes. An inlet buffer portion 40*a* and an outlet buffer portion 40*b* are respectively disposed in the vicinities of the inlet and the outlet of the coolant channel 38.

The inlet buffer portion 40*a* is connected to the coolant inlet manifolds 22*a* through a plurality of inlet connection channels 41*a*. The outlet buffer portion 40*b* is connected to the coolant outlet manifold 22*b* through a plurality of outlet connection channels 41*b*.

On the surfaces 14*a* and 14*b* of the cathode separator 14, a first sealing member 42 is integrally formed around the outer periphery of the cathode separator 14. On the surfaces 16*a* and 16*b* of the anode separator 16, a second sealing member 44 is integrally formed around the outer periphery of the anode separator 16. Each of the first sealing member 42 and the second sealing member 44 is made from an elastic material such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene-rubber, and acrylic rubber.

The operation of the fuel cell 10 will be described below.

First, as illustrated in FIG. 1, an oxidant gas, such as an oxygen-containing gas, is supplied to the oxidant gas inlet manifold 18*a*. A fuel gas, such as a hydrogen-containing gas, is supplied to the fuel gas inlet manifold 20*a*. A coolant, such as pure water, ethylene glycol, a cooling oil, or the like, is supplied to the pair of coolant inlet manifolds 22*a*.

Therefore, the oxidant gas is introduced from the oxidant gas inlet manifold 18*a* into the oxidant gas channel 30 of the cathode separator 14. As illustrated in FIG. 4, the oxidant gas moves along the oxidant gas channel 30 in the direction of arrow B (horizontal direction), and is supplied to the cathode electrode 26 of the membrane electrode assembly 12.

The fuel gas is supplied from the fuel gas inlet manifold 20*a* to the fuel gas channel 34 of the anode separator 16. As illustrated in FIG. 5, the fuel gas moves along the fuel gas channel 34 in the horizontal direction (direction of arrow B), and is supplied to the anode electrode 28 of the membrane electrode assembly 12 (see FIG. 1).

Accordingly, in the membrane electrode assembly 12, the oxidant gas supplied to the cathode electrode 26 and the fuel gas supplied to the anode electrode 28 are consumed in electrochemical reactions in the electrode catalyst layers, and thereby electric power is generated.

Next, the oxidant gas, which has been supplied to the cathode electrode 26 of the membrane electrode assembly 12 and consumed, is discharged along the oxidant gas outlet manifold 18*b* in the direction of arrow A. The fuel gas, which has been supplied to the anode electrode 28 of the membrane electrode assembly 12 and consumed, is discharged along the fuel gas outlet manifold 20*b* in the direction of arrow A.

As illustrated in FIG. 1, the coolant supplied to the pair of coolant inlet manifolds 22*a* is introduced into the coolant channel 38 between the cathode separator 14 and the anode separator 16. The coolant temporarily flows inward in the direction of arrow C (vertical direction), then moves in the direction of arrow B (horizontal direction), and cools the membrane electrode assembly 12. The coolant moves outward in the direction of arrow C and is discharged to the pair of coolant outlet manifolds 22*b*.

In this case, in the first embodiment, as illustrated in FIG. 4, part of each of the wave-shaped channel portions 30*ae*1 and 30*ae*2, which are included in the plurality of wave-shaped channel portions 30*a* of the oxidant gas channel 30 and which are disposed at ends in the vertical direction, protrudes outward from the planar region of the electrode catalyst layers 26*b* and 28*b*, i.e. the power generation region GF, in the vertical direction. Likewise, as illustrated in FIG. 5, part of each of the wave-shaped channel portions 34*ae*1 and 34*ae*2, which are included in the plurality of wave-shaped channel portions 34*a* of the fuel gas channel 34 and which are disposed at ends in the vertical direction, protrudes outward from the planar region of the electrode catalyst layers 26*b* and 28*b*, i.e. the power generation region GF, in the vertical direction.

Therefore, each of the wave-shaped channel portions 30*ae*1 and 30*ae*2 and wave-shaped channel portions 34*ae*1 and 34*ae*2 has a portion that is located outside of a reaction region. Accordingly, the chemical reaction that causes degradation at end portions of the electrodes is reduced, and thereby it is possible to suppress degradation of the solid polymer electrolyte membrane 24. Thus, an advantage is obtained in that the durability of the solid polymer electrolyte membrane 24 is appropriately improved.

Moreover, the amounts of consumption of the fuel gas and the oxidant gas are decreased in parts of the planer regions in which the electrode catalyst layers 26*b* and 28*b* are not disposed. Therefore, the flow rates of the fuel gas and the oxidant gas are increased. In particular, it is possible to smoothly discharge water from the wave-shaped channel portions 30*ae*1 and 34*ae*1, which are disposed at the lower end in the vertical direction and in which water tends to accumulate. Thus, with a simple structure, it is possible to easily and reliably discharge generated water, which tends to accumulate in lower portions of the oxidant gas channel 30 and the fuel gas channel 34 in the vertical direction, from the oxidant gas channel 30 and the fuel gas channel 34. Accordingly, dissolved ions are not trapped in the solid polymer electrolyte membrane 24, and therefore degradation of the solid polymer electrolyte membrane 24 is suppressed and a decrease in the performance of the electrodes is prevented.

Figure 6:
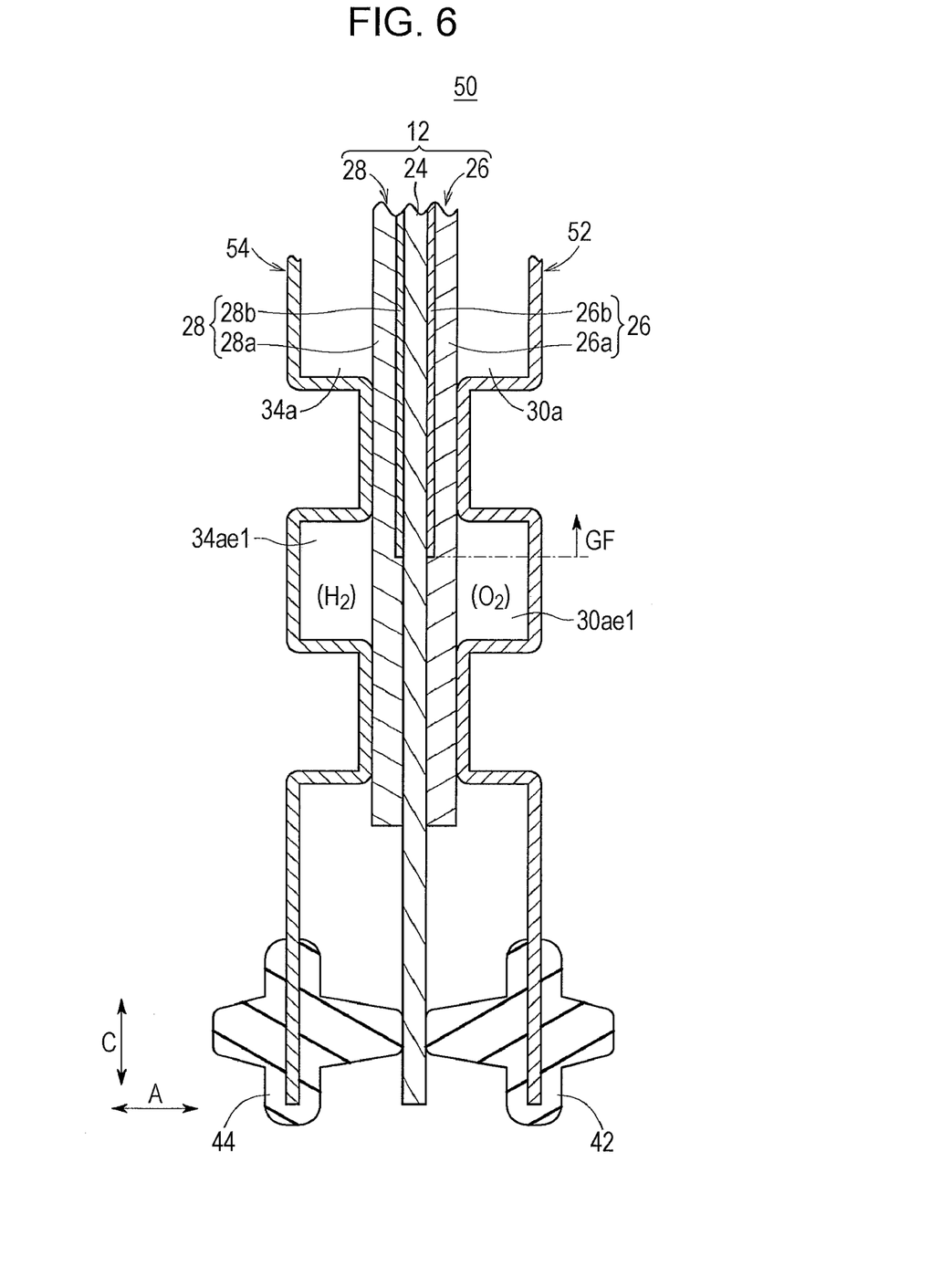
FIG. 6 is a partial cross-sectional view of a fuel cell according to a second embodiment.
Figure 7:
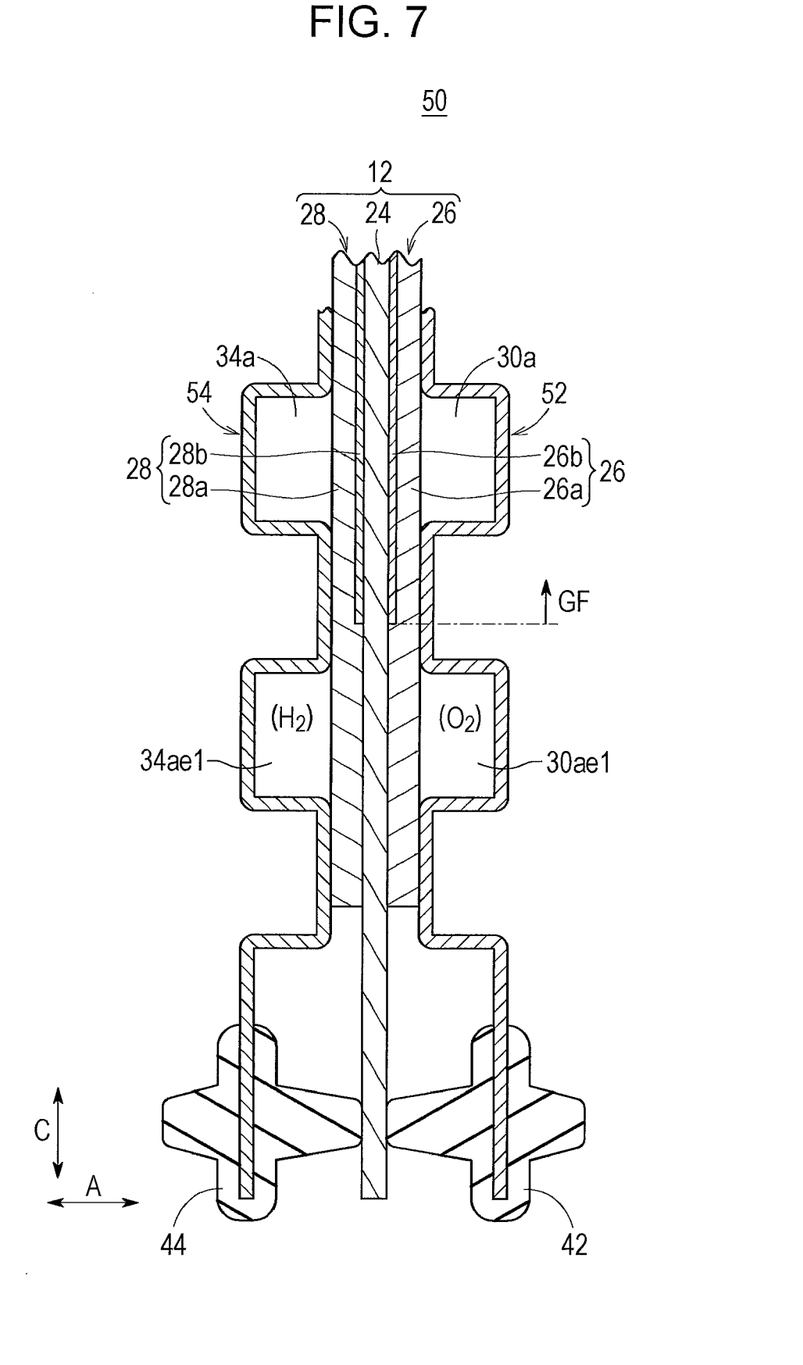
FIG. 7 is another partial cross-sectional view of the fuel cell.

As illustrated in FIGS. 6 and 7, a fuel cell 50 according to a second embodiment includes a membrane electrode assembly 12 sandwiched between a cathode separator 52 and an anode separator 54. The components of the fuel cell 50 that are the same as those of the fuel cell 10 according to the first embodiment will be denoted by the same numerals and detailed description of such components will be omitted. FIG. 6 is a cross-sectional view corresponding to FIG. 2 for the first embodiment, and FIG. 7 is a cross-sectional view corresponding to FIG. 3 for the first embodiment.

Figure 8:
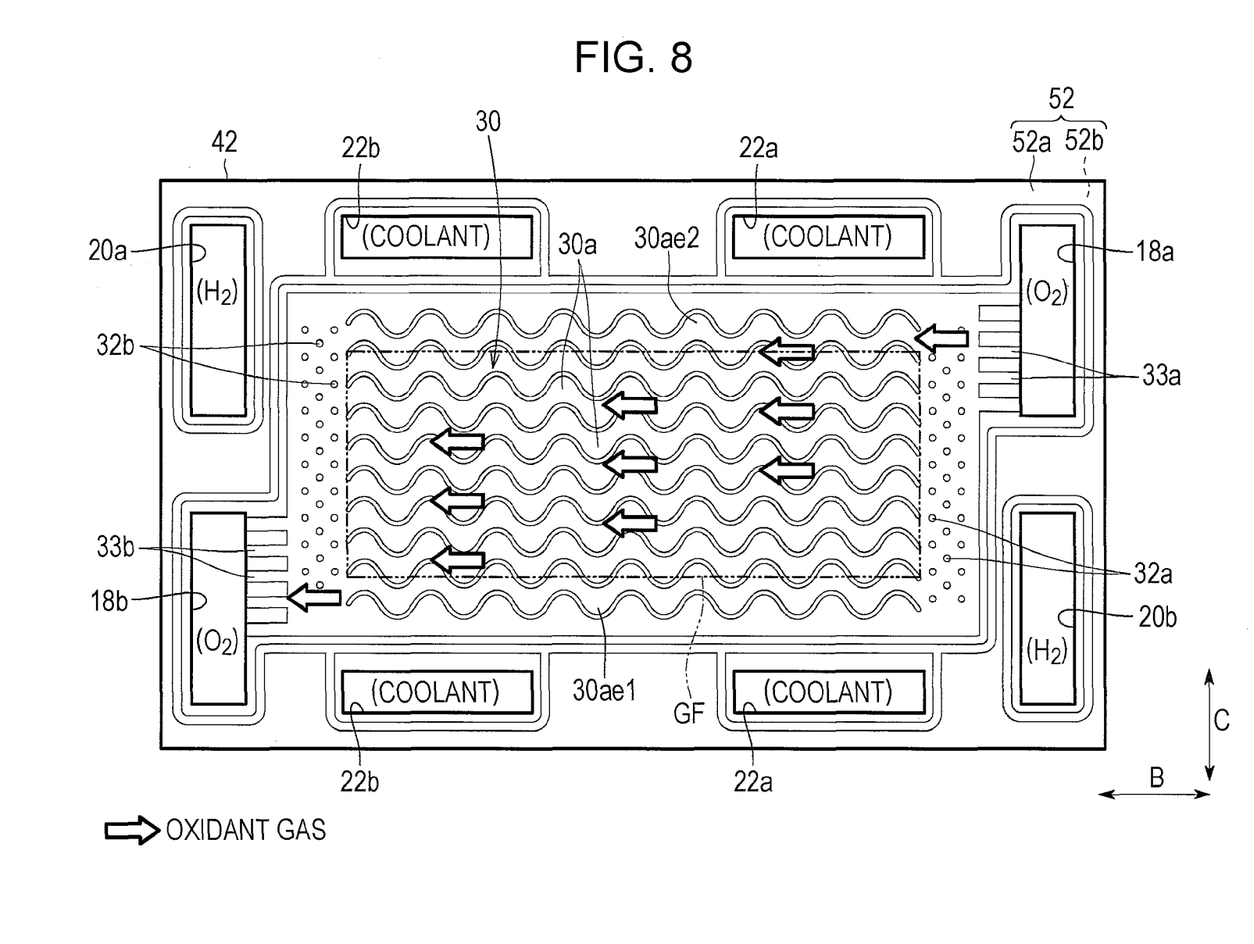
FIG. 8 is a plan view of a cathode separator of the fuel cell.

As illustrated in FIGS. 6 to 8, an oxidant gas channel 30 is formed on the cathode separator 52. A wave-shaped channel portion 30*ae*1 of the oxidant gas channel 30 is disposed at the lower end in the vertical direction, and the position of the lower end of the power generation region GF is set along upper parts of the wave-shaped channel portion 30ae1, which are curved (or bent) upward. A wave-shaped channel portion 30ae2 of the oxidant gas channel 30 is disposed at the upper end in the vertical direction, and the position of the upper end of the power generation region GF is set along lower parts of the wave-shaped channel portion 30ae2, which are curved (or bent) downward.

Figure 9:
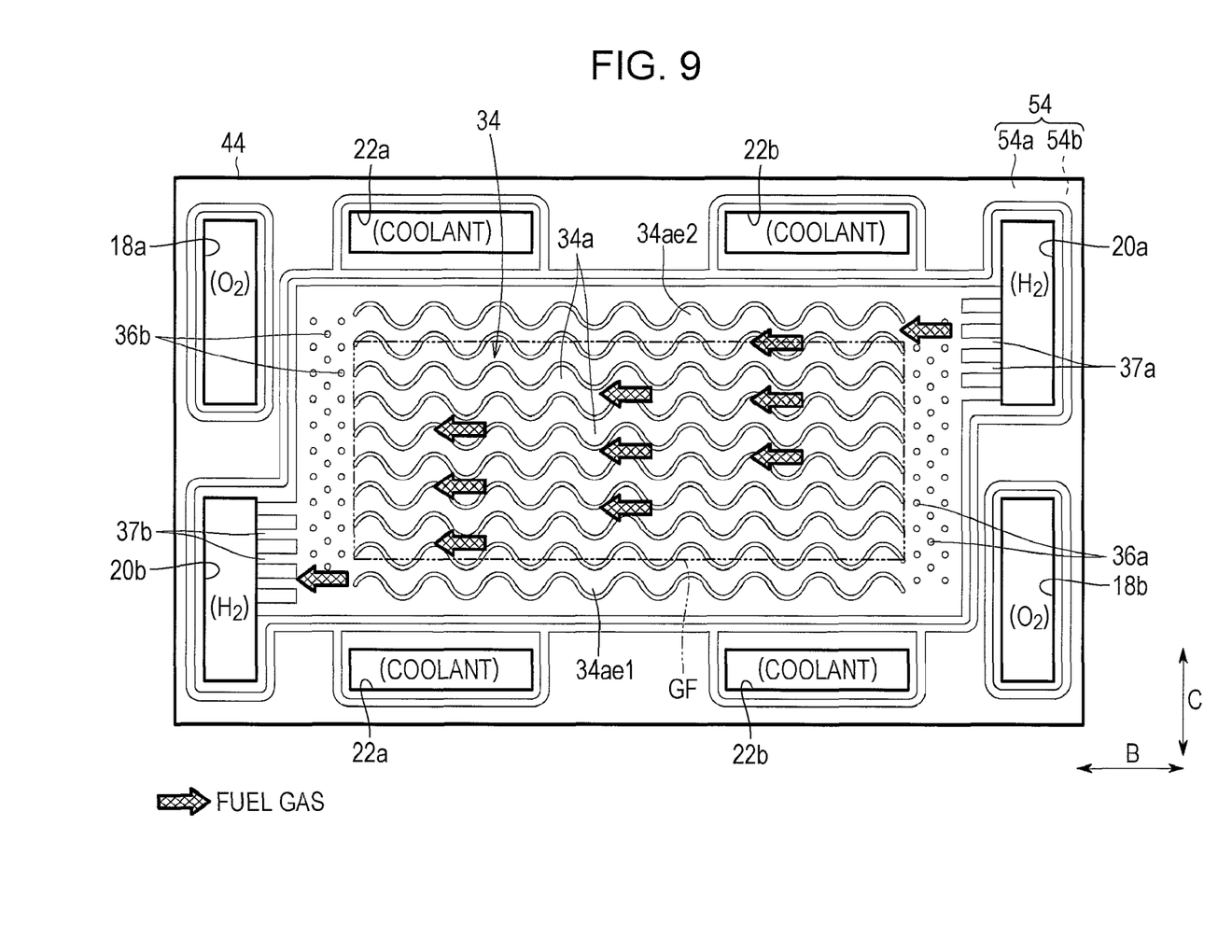
FIG. 9 is a plan view of an anode separator of the fuel cell.

As illustrated in FIGS. 6, 7, and 9, a fuel gas channel 34 is formed on the anode separator 54. A wave-shaped channel portion 34ae1 of the fuel gas channel 34 is disposed at the lower end in the vertical direction, and the position of the upper end of the power generation region GF is set along upper parts of the wave-shaped channel portion 34ae1, which are curved (or bent) upward. A wave-shaped channel portion 34ae2 of the fuel gas channel 34 is disposed at the upper end in the vertical direction, and the position of the upper end of the power generation region GF is set along lower parts of the wave-shaped channel portion 34ae2, which are curved (or bent) downward.

With the second embodiment having such a structure provides advantages the same as those of the first embodiment in that the durability of the solid polymer electrolyte membrane 24 is improved and water can be smoothly discharged.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell comprising:
a membrane electrode assembly comprising:
an electrolyte membrane; and
a pair of electrodes sandwiching the electrolyte membrane therebetween, each of the pair of electrodes including an electrode catalyst layer and a gas diffusion layer;
a separator stacked on the membrane electrode assembly in a first horizontal direction, the separator and the membrane electrode assembly being disposed in upright positions so that electrode surfaces extend in a vertical direction; and
a reactant gas channel through which a reactant gas flows along one of the electrode surfaces in a second horizontal direction, the reactant gas being an oxidant gas or a fuel gas, the reactant gas channel including a plurality of wave-shaped channel portions which are arranged in the vertical direction and each of which extends in the second horizontal direction so as to form a wave-like shape, part of at least one of the plurality of wave-shaped channel portions is disposed at an end of the reactant gas channel in the vertical direction so as to protrude outward from a planar region of the electrode catalyst layers in the vertical direction,
wherein the part of at least one of the plurality of wave-shaped channel portions extends beyond the electrode catalyst layers in the vertical direction, and
wherein the second horizontal direction and the vertical direction are disposed in a plane defined by the one of the electrode surfaces along which the reactant gas flows.

2. The fuel cell according to claim 1,
wherein the part of at least one of the plurality of wave-shaped channel portions is disposed at a lower end of the reactant gas channel in the vertical direction so as to protrude downward from the planar region of the electrode catalyst layers in the vertical direction.

3. The fuel cell according to claim 1,
wherein the part of at least one of the plurality of wave-shaped channel portions extends beyond an outer peripheral edge of the electrode catalyst layers in the vertical direction.

4. The fuel cell according to claim 1,
wherein the electrode catalyst layers define a power generation region, the part of at least one of the plurality of wave-shaped channel portions being disposed outside of the power generation region.

5. The fuel cell according to claim 1,
wherein the first horizontal direction is orthogonal to the plane defined by the one of the electrode surfaces along which the reactant gas flows.

6. A fuel cell comprising:
a membrane electrode assembly comprising:
an electrolyte membrane; and
a pair of electrodes sandwiching the electrolyte membrane therebetween, each of the pair of electrodes including an electrode catalyst layer and a gas diffusion layer;
a separator stacked on the membrane electrode assembly in a first horizontal direction, the separator and the membrane electrode assembly being disposed in upright positions so that electrode surfaces extend in a vertical direction; and
a reactant gas channel through which the reactant gas flows along one of the electrode surfaces in a second horizontal direction, the reactant gas being an oxidant gas or a fuel gas, the reactant gas channel including a plurality of channel portions which are arranged in the vertical direction and each of which extends in the second horizontal direction, part of at least one of the plurality of channel portions is disposed at an end of the reactant gas channel in the vertical direction so as to protrude outward from a planar region of the electrode catalyst layers in the vertical direction,
wherein the part of the of at least one of the plurality of channel portions extends beyond the electrode catalyst layers in the vertical direction, and
wherein the second horizontal direction and the vertical direction are disposed in a plane defined by the one of the electrode surfaces along which the reactant gas flows.

7. The fuel cell according to claim 6,
wherein the part of at least one of the plurality of channel portions is disposed at a lower end of the reactant gas channel in the vertical direction so as to protrude downward from the planar region of the electrode catalyst layers in the vertical direction.

8. The fuel cell according to claim 6,
wherein the part of at least one of the plurality of channel portions extends beyond an outer peripheral edge of the electrode catalyst layers in the vertical direction.

9. The fuel cell according to claim 6,
wherein the electrode catalyst layers define a power generation region, the part of at least one of the plurality of channel portions being disposed outside of the power generation region.

10. The fuel cell according to claim 6,
wherein the first horizontal direction is orthogonal to the plane defined by the one of the electrode surfaces along which the reactant gas flows.

* * * * *